United States Patent
Twelves et al.

(10) Patent No.: US 10,233,954 B2
(45) Date of Patent: Mar. 19, 2019

(54) METHOD AND ASSEMBLY FOR ATTACHING COMPONENTS

(71) Applicant: United Technologies Corporation, Hartford, CT (US)

(72) Inventors: Wendell V. Twelves, Glastonbury, CT (US); Kathleen E. Sinnamon, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 368 days.

(21) Appl. No.: 15/041,522

(22) Filed: Feb. 11, 2016

(65) Prior Publication Data

US 2016/0169256 A1    Jun. 16, 2016

Related U.S. Application Data

(62) Division of application No. 13/157,284, filed on Jun. 9, 2011, now Pat. No. 9,290,261.

(51) Int. Cl.
*F16B 1/00* (2006.01)
*F16B 5/02* (2006.01)
(Continued)

(52) U.S. Cl.
CPC .............. *F16B 5/0241* (2013.01); *B64C 1/06* (2013.01); *B64C 1/38* (2013.01); *B64C 9/02* (2013.01);
(Continued)

(58) Field of Classification Search
CPC ............... Y10T 403/21; Y10T 403/213; Y10T 403/217; Y10T 403/32091; Y10T 403/32163; Y10T 403/32221; Y10T 29/49826; Y10T 29/49947; Y10T 29/4932; Y10T 29/49323; Y10T 29/49863; Y10T 29/49865; F16B 2001/0078; F16B 1/0014; F16B 5/0241; B64C 1/38; B64C 1/06; B64C 9/02; B64F 5/00
(Continued)

(56) References Cited

U.S. PATENT DOCUMENTS

| 1,596,856 A | 8/1926 | Setlow |
| 3,016,746 A | 1/1962 | Holloway |

(Continued)

FOREIGN PATENT DOCUMENTS

| EP | 1152156 A1 | 11/2001 |
| JP | S6256784 | 3/1987 |

OTHER PUBLICATIONS

European Search Report for Application No. 12170610.5 dated Nov. 4, 2016.
(Continued)

*Primary Examiner* — Sarang Afzali
*Assistant Examiner* — Darrell C Ford
(74) *Attorney, Agent, or Firm* — Carlson, Gaskey & Olds, P.C.

(57) ABSTRACT

An exemplary method of adjustably mounting a first component to a second component includes, among other things, securing the first component to the second component with a linking member, and selectively adjusting the temperature of a variable portion of the linking member to change a size of the linking member.

16 Claims, 4 Drawing Sheets

(51) Int. Cl.
  *B64C 1/38*   (2006.01)
  *B64C 9/02*   (2006.01)
  *B64C 1/06*   (2006.01)
  *B64F 5/00*   (2017.01)

(52) U.S. Cl.
  CPC .......... *B64F 5/00* (2013.01); *Y10T 29/49826* (2015.01); *Y10T 403/21* (2015.01); *Y10T 403/217* (2015.01)

(58) Field of Classification Search
  USPC .... 29/428, 525.01, 889.2, 889.22, 446, 447; 411/82.5, 909; 403/28–30, 63, 72, 79
  See application file for complete search history.

(56) References Cited

U.S. PATENT DOCUMENTS

| | | | |
|---|---|---|---|
| 3,070,953 A | 1/1963 | Carrel | |
| 3,675,376 A | 7/1972 | Belew | |
| 4,243,189 A | 1/1981 | Ohgi | |
| 4,243,192 A | 1/1981 | Johnson | |
| 4,312,599 A | 1/1982 | Darolia | |
| 4,411,954 A | 10/1983 | Butch, III et al. | |
| 4,450,687 A | 5/1984 | Cole | |
| 4,556,591 A | 12/1985 | Bannink, Jr. | |
| 4,689,928 A | 9/1987 | Dutton et al. | |
| 4,834,569 A | 5/1989 | Foote et al. | |
| 4,841,100 A * | 6/1989 | Ignasiak | H05K 3/301 174/138 G |
| 4,861,229 A | 8/1989 | Halstead | |
| 4,863,122 A | 9/1989 | Bolang et al. | |
| 5,015,116 A | 5/1991 | Nardone et al. | |
| 5,120,175 A * | 6/1992 | Arbegast | F16B 1/0014 29/447 |
| 5,228,795 A * | 7/1993 | Gray | B64C 1/06 403/30 |
| 5,718,531 A * | 2/1998 | Mutschler, Jr. | B64G 1/22 294/103.1 |
| 5,829,253 A * | 11/1998 | Long | B64G 1/64 411/909 |
| 6,012,610 A | 1/2000 | Pauser et al. | |
| 6,045,291 A * | 4/2000 | Ruehle | F16B 19/1081 403/28 |
| 6,102,610 A | 8/2000 | Palusis et al. | |
| 6,126,371 A * | 10/2000 | McCloskey | B64G 1/641 411/544 |
| 6,171,009 B1 * | 1/2001 | Wright | F16B 5/0241 403/30 |
| 6,175,989 B1 * | 1/2001 | Carpenter | B64G 1/222 136/245 |
| 6,348,674 B1 * | 2/2002 | Russell | B23P 19/068 219/201 |
| 6,398,450 B1 * | 6/2002 | Jarvis | F16B 1/0014 29/447 |
| 6,425,829 B1 * | 7/2002 | Julien | B21K 1/56 411/909 |
| 6,679,062 B2 | 1/2004 | Conete et al. | |
| 6,758,653 B2 | 7/2004 | Morrison | |
| 6,895,761 B2 | 5/2005 | Mitchell et al. | |
| 6,910,853 B2 | 6/2005 | Carman et al. | |
| 7,416,362 B2 * | 8/2008 | North | F16B 5/0241 267/150 |
| 7,422,403 B1 * | 9/2008 | Johnson | B23P 11/025 411/392 |
| 7,647,779 B2 | 1/2010 | Shi et al. | |
| 7,878,459 B2 | 2/2011 | Mabe et al. | |
| 8,556,531 B1 | 10/2013 | Bird et al. | |
| 2002/0100840 A1 | 8/2002 | Billinger et al. | |
| 2003/0170092 A1 * | 9/2003 | Chiodo | C22F 1/006 411/82.5 |
| 2006/0046039 A1 * | 3/2006 | Krause | B62D 29/048 428/212 |
| 2006/0196700 A1 * | 9/2006 | Genoud | G01G 23/012 177/50 |
| 2007/0158127 A1 * | 7/2007 | Taguchi | B60N 2/015 180/271 |
| 2007/0212189 A1 * | 9/2007 | Naitou | F16B 1/0014 411/82.5 |
| 2009/0028697 A1 | 1/2009 | Shi et al. | |
| 2009/0035406 A1 | 2/2009 | Cleary, Jr. et al. | |
| 2009/0205147 A1 * | 8/2009 | Gil Coto | B64F 1/305 14/71.5 |
| 2009/0212158 A1 | 8/2009 | Mabe et al. | |
| 2009/0226327 A1 * | 9/2009 | Little | F01D 5/082 416/96 A |
| 2009/0272122 A1 | 11/2009 | Shi et al. | |
| 2010/0019096 A1 | 1/2010 | Pecora et al. | |
| 2010/0050399 A1 * | 3/2010 | Browne | C22F 1/006 24/455 |
| 2010/0104433 A1 | 4/2010 | Shi et al. | |
| 2010/0177414 A1 * | 7/2010 | Devilliers | G02B 7/1815 359/846 |
| 2010/0202855 A1 * | 8/2010 | Haasz | F16B 1/0014 411/515 |
| 2010/0227698 A1 | 9/2010 | Keith et al. | |
| 2010/0257864 A1 | 10/2010 | Prociw et al. | |
| 2010/0278649 A1 * | 11/2010 | Kuntze-Fechner | B29C 70/545 416/134 A |
| 2012/0311841 A1 * | 12/2012 | Twelves | B64C 9/02 29/428 |

OTHER PUBLICATIONS

European Search Report for Application No. 12170590.9 dated Nov. 14, 2016.

* cited by examiner

METHOD AND ASSEMBLY FOR ATTACHING COMPONENTS

CROSS-REFERENCE TO RELATED APPLICATIONS

This application is a divisional of U.S. patent application Ser. No. 13/157284, which was filed on 9 Jun. 2011 and is incorporated herein by reference, and now issued as U.S. Pat. No. 9,290,261.

BACKGROUND

This disclosure relates generally to securing components and, more particularly, to securing components that have different coefficients of thermal expansion.

As known, components having different coefficients of thermal expansion will expand and contract at different rates in response to temperature fluctuations. Securing components having different coefficients of thermal expansion is often difficult because the attachment strategy must accommodate the different rates of expansion and contraction.

The high temperature environment of an aircraft includes many components having different coefficients of thermal expansion. These components often need to be secured to each other. For example, some aircraft include a trailing edge assembly that is secured to a metallic airframe bracket. The trailing edge assembly is typically made of a ceramic matrix composite material, which has a lower coefficient of thermal expansion than the, typically metallic, airframe bracket. As can be appreciated, securing such a trailing edge assembly to the airframe bracket is difficult due, in part, to the growth and retraction of the trailing edge assembly relative to the airframe brackets.

The different rates of expansion and contraction between the trailing edge assembly and the airframe brackets have been accommodated by introducing slotted holes and flexures into the attachment strategy. These features offer limited positional precision, limited vibration resistance, and may not provide a rigid attachment.

SUMMARY

A method of adjustably mounting a first component to a second component having a different coefficient of thermal expansion than the first component according to an exemplary embodiment of the present disclosure includes, among other things, securing the components together with a linking member. The method selectively adjusts the temperature of a variable portion of the linking member to change the size of the linking member.

In a further non-limiting embodiment of the foregoing method, the method includes selectively adjusting by heating the variable portion In a further non-limiting embodiment of any of the foregoing methods, the method includes heating the variable portion using a heat tape.

In a further non-limiting embodiment of any of the foregoing methods, the method includes adjusting by cooling the variable portion.

In a further non-limiting embodiment of any of the foregoing methods, the method includes cooling the variable portion using a cooling fluid.

In a further non-limiting embodiment of any of the foregoing methods, the method includes selectively adjusting by cooling the variable portion using a cooling fluid.

In a further non-limiting embodiment of any of the foregoing methods, the method includes selectively adjusting the temperature of the variable portion using a fluid.

In a further non-limiting embodiment of any of the foregoing methods, the variable portion has a higher coefficient of thermal expansion than the portions of the linking member securing the linking member to the first component and the portions of the linking member securing the linking member to the second component.

In a further non-limiting embodiment of any of the foregoing methods, the first component has a different coefficient of thermal expansion than the second component.

In a further non-limiting embodiment of any of the foregoing methods, the method includes mixing a first fluid with a second fluid to provide a mixed fluid and selectively adjusting the temperature of the variable portion using the mixed fluid, wherein the first fluid is hotter than the second fluid.

In a further non-limiting embodiment of any of the foregoing methods, the method includes using a valve to selectively permit communication of a fluid to a position near the variable portion to vary a length of the linking member.

In a further non-limiting embodiment of any of the foregoing methods, the valve is configured to permit communication of a fluid at a first temperature to the position to change the length in a first direction, and further configure to permit communication of a fluid at a second temperature to the position to vary the length in a second direction, the first temperature greater than the second temperature.

In a further non-limiting embodiment of any of the foregoing methods, the fluid at the first temperature comprises air heated by a turbomachine.

In a further non-limiting embodiment of any of the foregoing methods, the fluid at the second temperature comprises bleed air from a turbomachine.

In a further non-limiting embodiment of any of the foregoing methods, the variable portion couples a first attachment portion to a second attachment portion, the first attachment portion configured to connect a linking member to the first component, a second attachment portion configured to connect the linking member to the second component, wherein heating the variable portion varies a distance between the first attachment portion and the second attachment portion in a first direction, and cooling the variable portion varies the distance between the first attachment portion and the second attachment portion in a second direction when cooled, the first direction opposite the second direction.

In a further non-limiting embodiment of any of the foregoing methods, the method includes connecting a radially outer tube to both the variable portion and the first attachment portion, and connecting a radially inner tube to both the variable portion and the second attachment portion, the radially inner tube at least partially received within the radially outer tube, the variable portion being a component that is separate and distinct from both the radially outer tube and the radially inner tube.

In a further non-limiting embodiment of any of the foregoing methods, the method includes using a valve to selectively permit communication of a fluid to a position radially between the outer tube and the variable portion to vary the distance.

In a further non-limiting embodiment of any of the foregoing methods, the variable portion has a higher coefficient of thermal expansion than both the first attachment portion and the second attachment portion.

In a further non-limiting embodiment of any of the foregoing methods, the first component has a coefficient of thermal expansion that is different than the coefficient of thermal expansion of the second component.

In a further non-limiting embodiment of any of the foregoing methods, the first component is a ceramic matrix composite component, and the second component has a higher coefficient of thermal expansion than the first component.

In a further non-limiting embodiment of any of the foregoing methods, the first component or the second component is trailing edge assembly of an aircraft, and the other of the first component or the second component is a metal airframe structure of the aircraft.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
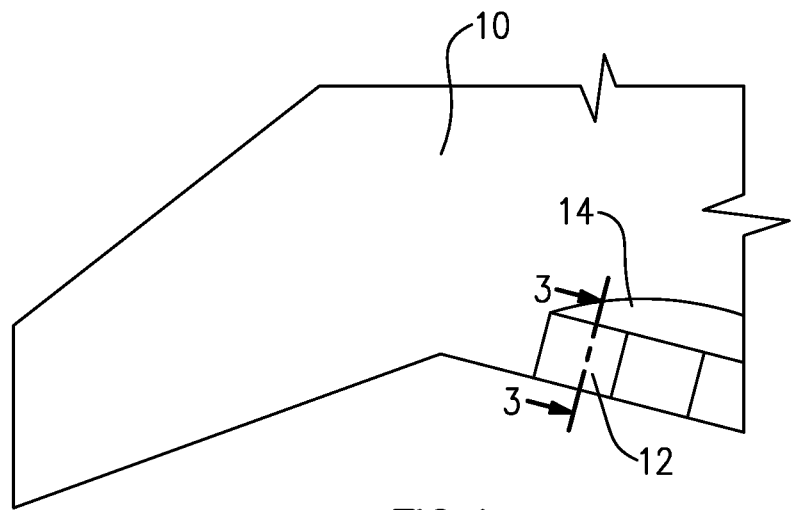
FIG. 1 shows a perspective view of a trailing edge assembly of an aircraft.

Referring to FIGS. 1-4, in this example, an aircraft 10 includes a first component and a second component. The first component is a trailing edge assembly 12. The second component is an airframe structure 14.

The example trailing edge assembly 12 includes an outer shell 16 and ribs 18 spanning opposing walls of the outer shell 16. A mounting assembly 20 is secured to the ribs 18 to connect the trailing edge assembly 12 to the airframe structure 14. In this example, the mounting assembly 20 includes a plurality of linking members 22. Each of the linking members 22 extends between a first attachment portion 24 and a second attachment portion 26. The first attachment portion 24 is secured to the ribs 18, and the second attachment portion 26 is secured to the mounting assembly 20.

The first attachment portions 24 of the example linking members 22 are secured directly to the ribs 18 with fasteners 32. The second attachment portions 26 of the linking members 22 are secured to a bracket 28 with fasteners 30, which is fastened directly to the airframe structure 14 with a plurality of fasteners 31. In another example, the second attachment portions 26 are secured directly to the airframe structure 14 with the fasteners 30.

The trailing edge assembly 12 and the airframe structure 14 have different coefficients of thermal expansion. Thus, as the trailing edge assembly 12 and the airframe structure 14 are heated, the trailing edge assembly 12 changes length at a different rate than the airframe structure 14. In one example, the trailing edge assembly 12 is a ceramic matrix composite component, and the airframe structure 14 is a metallic material.

The adjustable linking members 22 of the mounting assembly 20 accommodate the different rates of thermal expansion and contraction. Accommodating these differences limits contact between the trailing edge assembly 12 and the airframe structure 14 particularly at interfaces between the two components such as the interfaces 34. Undesirable contact can damage the trailing edge assembly 12, for example. Accommodating these differences also controls the size of gaps at the interfaces 34.

Figure 2:
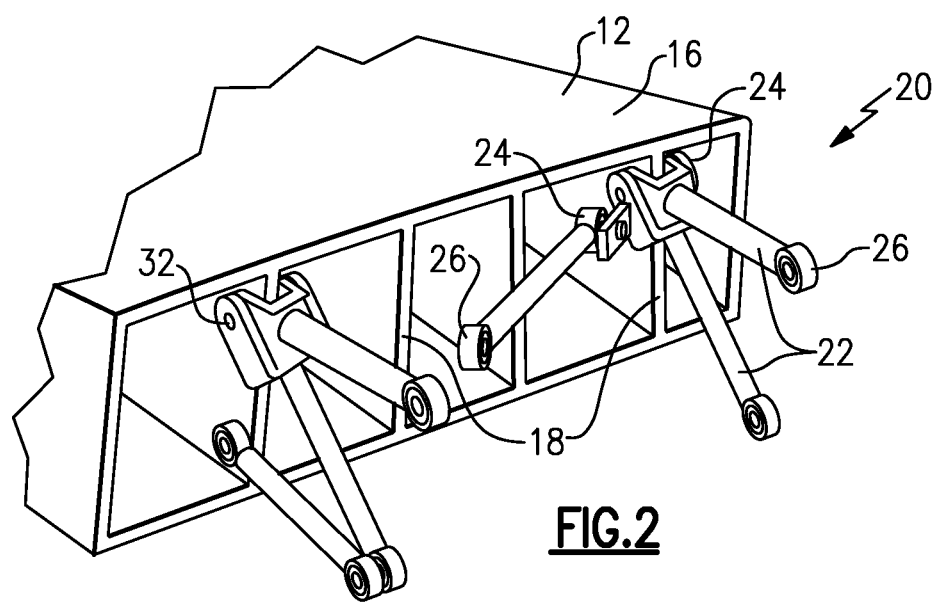
FIG. 2 shows an end view of the FIG. 1 trailing edge structure and a mounting assembly.
Figure 3:
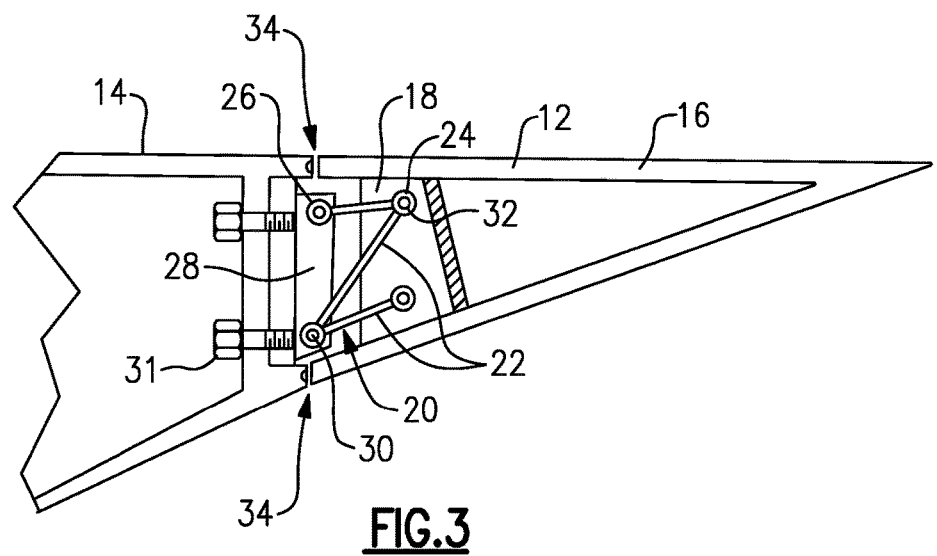
FIG. 3 is a section view at line 3-3 in FIG. 1 showing the trailing edge assembly in an assembled position.
Figure 4:
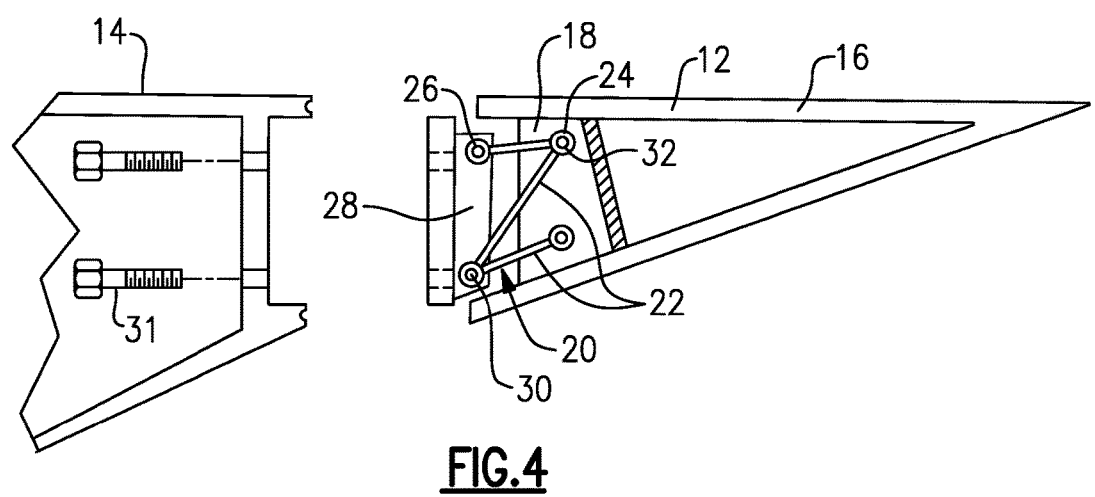
FIG. 4 is a section view at line 3-3 in FIG. 1 showing the trailing edge assembly in an unassembled position.
Figure 5:
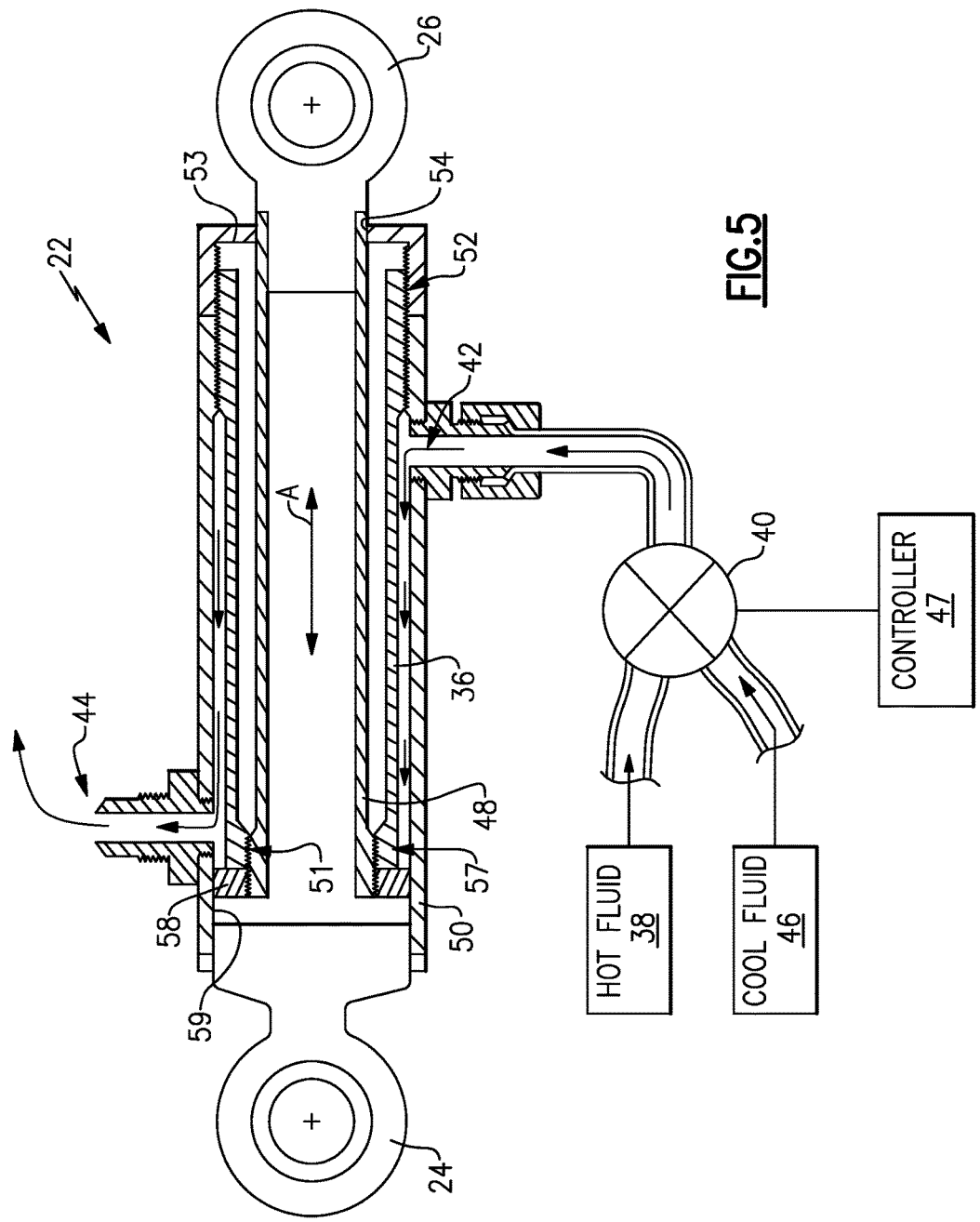
FIG. 5 is a section view of a linking member of the FIG. 2 mounting assembly.

Referring now to FIG. 5 with continuing reference to FIGS. 2-4, in this example, the adjustable linking members 22 each include a variable portion 36. The variable portion 36 is made of a material having a higher coefficient of thermal expansion than the first attachment portion 24 and the second attachment portion 26. In one example, the variable portion 36 is made of an aluminum or steel material, and the first attachment portion 24 and the second attachment portion 26 are both made of a graphite or titanium material. The materials need not be metallic.

Heating the variable portion 36 causes the variable portion 36 to expand, and particularly along the axis A. This expansion of the variable portion 36 moves the first attachment portion 24 away from the second portion 26 in a first direction along the axis A. Expanding the variable portion 36 increases the axial length of the adjustable linking member 22.

In this pneumatic example, a heating fluid, such as hot air, is used to heat the variable portion 36. The heating fluid is communicated from a hot fluid supply 38 through an adjustable valve 40 to a fluid communication path 42 radially outside the variable portion 36. The heating fluid is then vented from the adjustable linking member 22 at a vent location 44. The valve 40 controls the extension of the variable portion 36 by controlling the flow of heating fluid to the fluid communication path 42 to heat the variable potion 36.

In this example, the valve 40 is moveable to a position that communicates a cooling fluid from a cold fluid supply 46 into the fluid communication path 42. Cooling the variable portion 36 causes the variable portion 36 to retract in a second direction opposite the first direction. Retracting the variable portion 36 decreases the axial length of the linking member 22.

In one example, the hot fluid supply 38 is air that has been heated by a turbomachine of the aircraft 10, and the cold fluid supply 46 is ambient air such as bleed air. Other examples may use fluids other than air, and other sources of heating and cooling.

As can be appreciated, the valve 40 may mix the heating fluid with the cooling fluid to adjust the temperature of the fluid entering the fluid communication path 42. A person having skill in this art and the benefit of this disclosure would understand how to design a suitable valve 40.

In some examples, the cooling fluid is not used. In these examples, the variable portion 36 is not actively cooled.

When the trailing edge assembly 12 and the airframe structure 14 are expanding at different rates due to an increase in temperature, an operator may initiate extension of the adjustable linking member 22 by increasing the flow of hot fluid from the hot fluid supply 38. A controller 47 may be used to initiate movement of the valve 40, for example. Extending the adjustable linking member 22 increases the distance between the trailing edge assembly 12 and the airframe structure 14 to prevent damage to the trailing edge assembly 12 due to contact with the airframe structure 14 as the trailing edge assembly 12 grows relative to the airframe structure 14.

In this example, the adjustable linking member 22 includes an inner tube 48 and an outer tube 50. The variable portion 36 connects the inner tube 48 to the outer tube 50. One end of the inner tube 48 is threadably connected to the variable portion 36 at a position 51, and another end of the inner tube 48 is connected to the second attachment portion 26. Also, one end of the outer tube 50 is threadably connected to the variable portion 36 at a position 52, and another end of the outer tube 50 is connected to the first attachment portion 24. The linking member 22 has a higher coefficient of thermal expansion than both the inner tube 48 and the outer tube 50.

As can be appreciated, axial extension of the variable portion 36 causes the first attachment portion 24 and the second attachment portion 26 to move axially away from each other. Also, axial retraction of the variable portion 36 causes the first attachment portion 24 and the second attachment portion 26 to move axially toward each other.

In this example, the first attachment portion 24 is directly secured to the outer tube 50 via an interference fit. That is, the first attachment portion 24 includes a radially oversized area relative to the outer tube 50 that is received within the outer tube 50. The oversized areas cause the outer tube 50 to hold the first attachment portion 24 within the outer tube 50. The second attachment portion 26 is received within the inner tube 48 and held relative to the inner tube 48 via an interference fit. In other examples, the first attachment portion 24 and the second attachment portion 26 are secured using other techniques.

In this example, the variable portion 36 is also threadably attached to a base 53. The base 53 establishes an aperture 54 that receives a portion of the inner tube 48 and the second attachment portion 26. A collet nut (not shown) may be used to secure the inner tube 48 and the second attachment portion 26 within the aperture 54.

The inner tube 48 is also threadably secured to a spacer 58 that helps radially centers the inner tube 48 within the outer tube 50 during extension and retraction of the variable portion 36. The spacer 58 slides within the outer tube 50 along an inner wall 59 of the outer tube 50.

Figure 6:
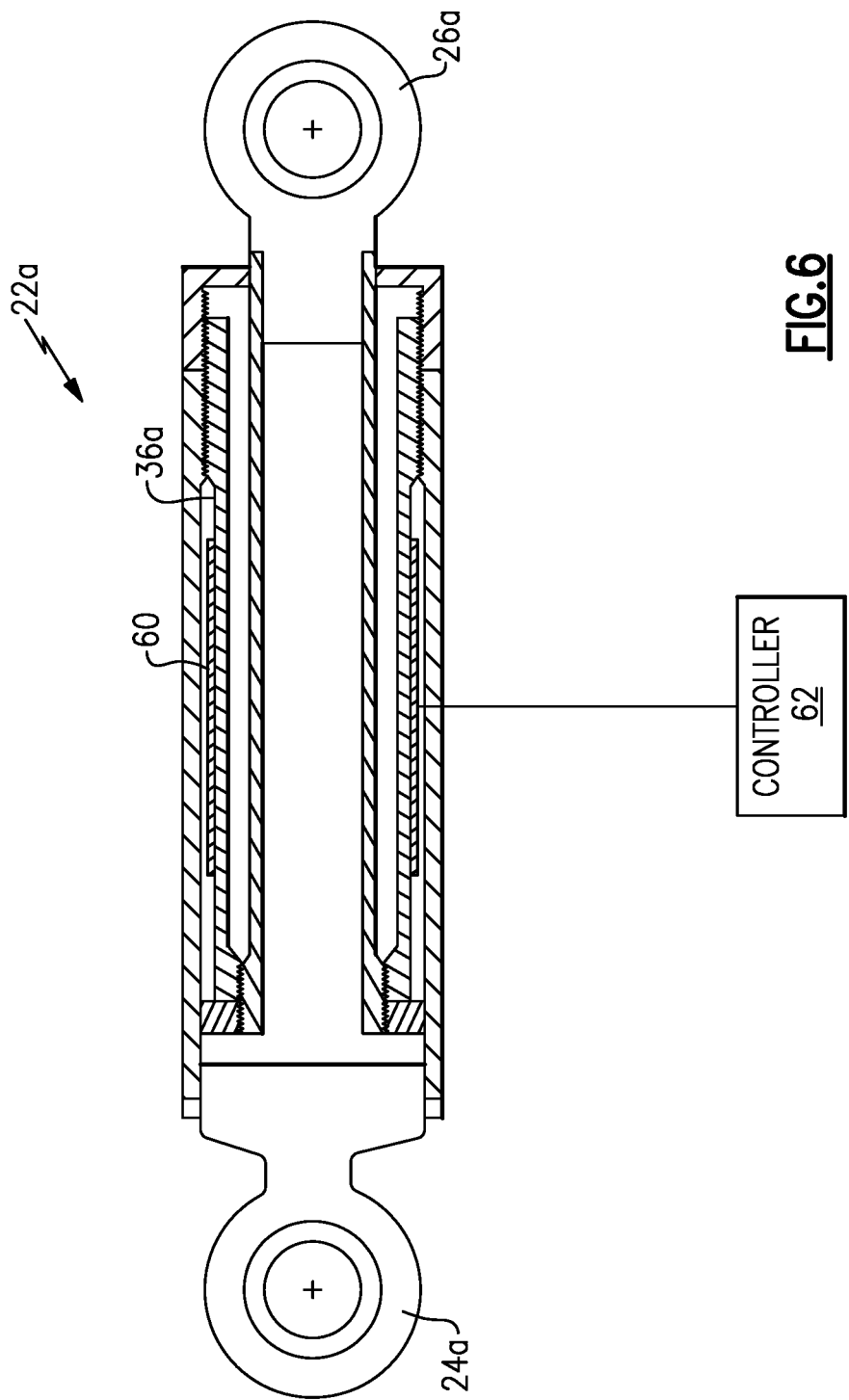
FIG. 6 is a section view of another example linking member suitable for use in the FIG. 2 mounting assembly.

Referring to another example linking member 22a of FIG. 6, includes a variable portion 36a that is heated using a technique other than moving a heated fluid near the variable portion 36a. In this example, the variable portion 36a is heated with a heat tape 60 that is wrapped about areas of the variable portion 36a. To extend a first attachment portion 24a relative to the second attachment portion 26a, a controller 62 sends a current through the heat tape 60, which introduces thermal energy to the variable portion 36a to extend the variable portion 36a. Retracting the linking member 22a would take place when current to the heat tape 60 is blocked and the variable portion 36a is allowed to cool by ambient air or bleed air.

A person having skill in the art and the benefit of this disclosure may understand still other techniques to heat and cool the variable portions 36 and 36a of the disclosed examples.

Although described as securing components having different coefficients of thermal expansion. The example adjustable linking members 22 and 22a may be used to secure components having the same coefficient of thermal expansion.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A method of adjustably mounting a first component to a second component, comprising:
   securing the first component to the second component with a linking member, wherein the first component is a first aircraft component, the second component is a second aircraft component, and the first component has a different coefficient of thermal expansion than the second component;
   selectively adjusting the temperature of a variable portion of the linking member to change a size of the linking member;
   wherein the step of selectively adjusting the temperature includes selectively adjusting the temperature of the variable portion using a fluid, including selectively adjusting the temperature by cooling the variable portion using a cooling fluid, and including selectively adjusting the temperature by heating the variable portion; and wherein the variable portion couples a first attachment portion to a second attachment portion, the first attachment portion configured to connect the linking member to the first component, the second attachment portion configured to connect the linking member to the second component, wherein heating the variable portion varies a distance between the first attachment portion and the second attachment portion in a first direction, and cooling the variable portion varies the distance between the first attachment portion and the second attachment portion in a second direction, the first direction opposite the second direction, and wherein the distance establishes a gap that is maintained between opposed interfaces of the first and second aircraft components in response to the heating and the cooling.

2. The method of claim 1, further comprising heating the variable portion using a heat tape.

3. The method of claim 1, wherein the variable portion has a higher coefficient of thermal expansion than the portions of the linking member securing the linking member to the first component and the portions of the linking member securing the linking member to the second component.

4. The method of claim 1, further comprising mixing a first fluid with a second fluid to provide a mixed fluid and selectively adjusting the temperature of the variable portion using the mixed fluid, wherein the first fluid is hotter than the second fluid.

5. The method of claim 1, further comprising using a valve to selectively permit communication of the fluid to a position near the variable portion to vary a length of the linking member.

6. The method of claim 5, wherein the valve is configured to permit communication of the fluid at a first temperature to the position to change the length in a first direction, and further configure to permit communication of the fluid at a second temperature to the position to vary the length in a second direction, the first temperature greater than the second temperature.

7. The method of claim 6, wherein the fluid at the first temperature comprises air heated by a turbomachine.

8. The method of claim 6, wherein the fluid at the second temperature comprises bleed air from a turbomachine.

9. The method of claim 1, wherein the linking member includes a radially outer tube and a radially inner tube, and further comprising connecting the radially outer tube to both the variable portion and the first attachment portion, and connecting the radially inner tube to both the variable portion and the second attachment portion, the radially inner tube at least partially received within the radially outer tube, the variable portion being a component that is separate and distinct from both the radially outer tube and the radially inner tube.

10. The method of claim 9, further comprising using a valve to selectively permit communication of the fluid to a position radially between the outer tube and the variable portion to vary the distance.

11. The method of claim 10, wherein the radially inner tube, the radially outer tube and the variable portion extend along a common longitudinal axis.

12. The method of claim 11, wherein the first aircraft component is a ceramic matrix composite component, and the second aircraft component has a higher coefficient of thermal expansion than the first component.

13. The method of claim 12, wherein one of the first aircraft component and the second aircraft component is trailing edge assembly of an aircraft, and the other one of the first aircraft component and the second aircraft component is a metal airframe structure of the aircraft.

14. The method of claim 1, wherein the variable portion has a higher coefficient of thermal expansion than both the first attachment portion and the second attachment portion.

15. The method of claim 1, wherein the first component is a ceramic matrix composite component, and the second component has a higher coefficient of thermal expansion than the first component.

16. The method of claim 1, wherein the first component or the second component is trailing edge assembly of an aircraft, and the other of the first component or the second component is a metal airframe structure of the aircraft.

* * * * *